(12) United States Patent
Vanco et al.

(10) Patent No.: US 11,748,174 B2
(45) Date of Patent: Sep. 5, 2023

(54) METHOD FOR ARBITRATION AND ACCESS TO HARDWARE REQUEST RING STRUCTURES IN A CONCURRENT ENVIRONMENT

(71) Applicant: Intel Corporation, Santa Clara, CA (US)

(72) Inventors: Juraj Vanco, Trencin (SK); Conor McLoughlin, Limerick (IE); John Browne, Limerick (IE)

(73) Assignee: Intel Corporation, Santa Clara, CA (US)

( * ) Notice: Subject to any disclaimer, the term of this patent is extended or adjusted under 35 U.S.C. 154(b) by 823 days.

(21) Appl. No.: 16/590,490

(22) Filed: Oct. 2, 2019

(65) Prior Publication Data
US 2020/0034214 A1    Jan. 30, 2020

(51) Int. Cl.
*G06F 9/52* (2006.01)
*G06F 9/50* (2006.01)
*G06F 13/16* (2006.01)
*G06F 13/28* (2006.01)

(52) U.S. Cl.
CPC ............ *G06F 9/526* (2013.01); *G06F 9/5005* (2013.01); *G06F 13/1663* (2013.01); *G06F 13/28* (2013.01)

(58) Field of Classification Search
CPC .... G06F 9/526; G06F 9/5005; G06F 13/1663; G06F 13/28
USPC ........................................................ 710/108
See application file for complete search history.

(56) References Cited

U.S. PATENT DOCUMENTS

| | | | | |
|---|---|---|---|---|
| 5,475,860 A | * | 12/1995 | Ellison | G06F 13/124 709/212 |
| 5,499,384 A | * | 3/1996 | Lentz | G06F 13/124 710/200 |
| 5,922,057 A | * | 7/1999 | Holt | G06F 15/167 710/52 |
| 6,745,266 B1 | * | 6/2004 | Johnson | G06F 3/064 711/E12.019 |
| 6,789,133 B1 | * | 9/2004 | Crandall | G06F 3/0607 710/39 |
| 7,031,928 B1 | * | 4/2006 | Cochran | G06F 9/5016 705/7.11 |

(Continued)

*Primary Examiner* — Paul R. Myers
(74) *Attorney, Agent, or Firm* — Compass IP Law PC (57) ABSTRACT

Methods and apparatus for arbitration and access to hardware request ring structures in a concurrent environment. A request ring mechanism is provided including an arbiter, ring overflow guard, request ring, and request ring metadata, each of which is implemented in shared virtual memory (SVM) on a computing platform including a multi-core processor coupled to an offload device having one or more SVM-capable accelerators. Worker threads request to access the request ring to provide job descriptors to be processed by the accelerator(s). A lockless arbiter returns either an index of a slot in which to write a descriptor or information indicating the ring is full to each worker thread. The scheme enables worker threads to write descriptors to slots in the request ring corresponding to the returned indexes without contention from other worker threads. The ring overflow guard prevents valid descriptors from being overwritten before they are taken off the ring by the accelerator(s). The request ring metadata is used indicate a valid/invalid status of the ring entries.

23 Claims, 8 Drawing Sheets

(56) References Cited

U.S. PATENT DOCUMENTS

| | | | | |
|---|---|---|---|---|
| 7,346,048 B1* | 3/2008 | Vogel | H04Q 3/0025 | 370/523 |
| 7,561,571 B1* | 7/2009 | Lovett | H04L 12/66 | 370/422 |
| 7,620,753 B1* | 11/2009 | Beaman | G06F 9/526 | 710/52 |
| 7,631,122 B1* | 12/2009 | Wyatt | G06F 9/546 | 710/52 |
| 8,738,860 B1* | 5/2014 | Griffin | G06F 12/0897 | 711/122 |
| 10,303,383 B1* | 5/2019 | Karr | G06F 16/2255 | |
| 10,417,209 B1* | 9/2019 | Deran | G06F 16/2329 | |
| 2001/0038633 A1* | 11/2001 | Robertson | H04L 7/005 | 370/429 |
| 2002/0112100 A1* | 8/2002 | Zimmerman | G06F 9/544 | 710/1 |
| 2003/0056038 A1* | 3/2003 | Cochran | G06F 11/2069 | 710/36 |
| 2003/0227933 A1* | 12/2003 | Eberle | H04L 49/9063 | 370/412 |
| 2005/0129046 A1* | 6/2005 | Kumar | H04L 49/90 | 370/428 |
| 2007/0094652 A1* | 4/2007 | Chia | G06F 8/452 | 717/151 |
| 2009/0044194 A1* | 2/2009 | Rathi | G06F 9/526 | 718/100 |
| 2009/0083517 A1* | 3/2009 | Riddle | G06F 9/526 | 712/30 |
| 2009/0172212 A1* | 7/2009 | Stanton | G06F 13/122 | 710/18 |
| 2009/0204755 A1* | 8/2009 | Rushworth | G06F 9/526 | 711/E12.001 |
| 2009/0249356 A1* | 10/2009 | He | G06F 9/546 | 719/314 |
| 2009/0254680 A1* | 10/2009 | Pfister | G06F 13/385 | 710/5 |
| 2010/0312985 A1* | 12/2010 | Rostedt | G06F 9/52 | 711/E12.078 |
| 2013/0014120 A1* | 1/2013 | Ross | G06F 9/526 | 718/104 |
| 2014/0244944 A1* | 8/2014 | Mortier | G06F 3/0613 | 711/147 |
| 2015/0234933 A1* | 8/2015 | Grover | G06F 16/2336 | 707/800 |
| 2016/0379721 A1* | 12/2016 | Raj | G11C 29/52 | 365/201 |
| 2018/0025704 A1* | 1/2018 | Gopishankar | G09G 5/377 | 345/629 |
| 2018/0150298 A1* | 5/2018 | Balle | G06F 9/5083 | |
| 2019/0347125 A1* | 11/2019 | Sankaran | G06F 9/4411 | |
| 2021/0109857 A1* | 4/2021 | Kumar | G06F 3/067 | |
| 2021/0303551 A1* | 9/2021 | Stevens | G06F 9/544 | |

* cited by examiner

METHOD FOR ARBITRATION AND ACCESS TO HARDWARE REQUEST RING STRUCTURES IN A CONCURRENT ENVIRONMENT

BACKGROUND INFORMATION

Data analytics and "Big Data" processing have become increasingly important in recent years. Data analytics and Big Data workloads require processing huge amounts of data. One approach for processing such huge amounts of data is to distribute the processing tasks across large numbers of servers and process the workload in parallel. For example, the Apache Hadoop software framework enables tasks to be distributed across large numbers of commodity servers and process workloads using MapReduce. While Hadoop and MapReduce provide excellent scalability, they require a tremendous amount of inter-server communication (when implemented at large scale), and do not efficiently use processor and memory resources.

Telecommunication networks also place high demands on CPU (Central Processing Unit) workloads. For example, Software Defined Networking (SDN) and virtual network appliances have supplemented use of stand-alone physical appliances for many telecom environments. SDN frameworks, such as the recently open-sourced Data Plane Development Kit (DPDK), are used to accelerate packet processing workloads running on a wide variety of CPU architectures.

Some compute and memory-bandwidth intensive workloads such as used for data analytics, Big Data, and SDN are hard to get the required level of performance with CPU cores alone. To address this, so-called "accelerators" and "co-processors" have been developed. (For simplicity, the term "accelerator" will be used herein to cover various types of data processing units that generally be used for performing functions associated with accelerators or co-processors and the like.) Under one approach, accelerators are implemented as components on a PCIe (Peripheral Component Interconnect Express) "offload" device comprising a PCIe card or module that is coupled over a PCIe link to a processor or System on a Chip (SoC) including a multi-core CPU and managed as an IO (input-output) device with its own address space. This requires significant levels of IO communication to transfer data between the accelerator address space and applications running one the processor cores in system memory address space.

Generally, some type of mechanism is employed for communicating information relating to processing tasks to be performed by the accelerators (commonly referred to a job descriptors or simply "descriptors"), enabling the corresponding work associated with the descriptors to be offloaded from CPU cores and handled by the accelerators. Under one approach, a ring buffer (referred to herein as a "ring" for short) is used to submit descriptors from multiple producers (e.g., applications and/or multiple threads in a given application), where the descriptors are "consumed" by one or more accelerators using a producer-consumer paradigm. To coordinate submission of descriptors onto the ring, various types of locking mechanisms may be used, such as thread mutexes, futexes (user-space locks) or other types of CPU locks, as well as atomic Compare and Swap (CAS) methods. In addition, today's approaches may employ Memory-Mapped IO (MMIO) operations under which application threads access registers or memory on-board the PCIe offload device using PCIe transactions transmitted over the PCIe link. Existing locking mechanisms reduce CPU performance causing stalls and/or collisions, while MMIO operations entail significant CPU overhead (in terms of CPU cycles).

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of methods and apparatus for arbitration and access to hardware request ring structures in a concurrent environment are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments described herein, the performance of accelerator communications is improved by removing unnecessary CPU locks and MMIO operations, resulting in improved throughput and latency for PCIe offload devices. The embodiments improve overall performance for CPU by reducing CPU cycles to support communication between CPU threads and accelerators, and improve overall CPM performance.

Figure 1:
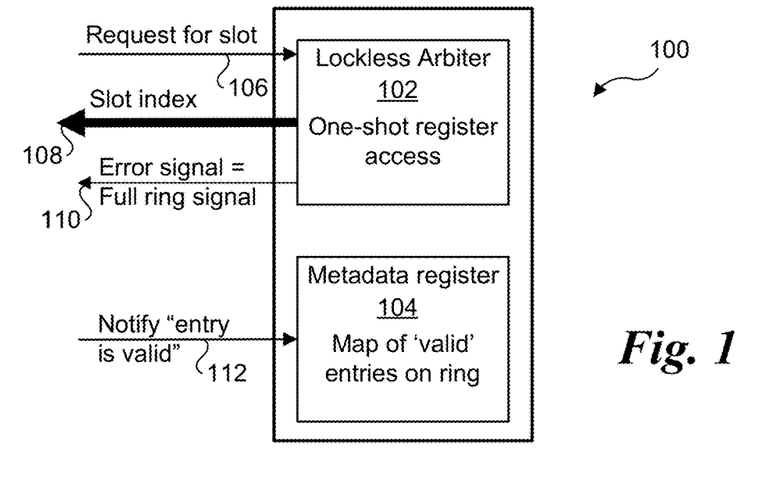
FIG. 1 shows a block-level diagram illustrating the primary blocks of a request provisioning mechanism, according to one embodiment.

In accordance with some embodiments, a request provisioning mechanism comprising employing a lockless arbiter and ring overflow guard is used in combination with a request ring structure and associated request ring metadata. FIG. 1 shows a block-level diagram 100 illustrating the primary blocks of one implementation of the mechanism. Generally, the blocks may be implemented in hardware, software, or a combination of hardware and software. As shown, the primary blocks include a lockless arbiter 102 and a metadata register 104. In one embodiment lockless arbiter 102 facilitates one-shot register access functionality under which every requesting thread returns either an index to a new slot or error signal that the ring is full. The one-shot register access is facilitated without employing the use of software locks, such as mutexes, futexes, or other types of software locks; accordingly, the term "lockless" in the lockless arbiters means the arbiter mechanism does not employ such software locks. As illustrated, lockless arbitrator 102 receives request for slots 106 from threads requesting a ring slot. For example, the lockless arbitrator functionality described herein may be implemented as a method or function called by a thread, or via an in-line function. Under the called method or function, the block of code for implementing the lockless arbiter functionality receives the request for accessing a slot when that function or method is called. In response, lockless arbiter 102 returns a slot index 108 if a ring slot is available, otherwise it returns an error signal 110 indicating the ring is full. Further details of these operations and functionality are explained below in FIG. 2, which employs new arbiter and guard components.

After a thread gets an index, the thread updates a ring entry at the slot corresponding to the index. For example, in one embodiment the ring entry contains a descriptor that includes information relating to work to be down by an offload processing unit (e.g., accelerator), such as the addresses of input buffers containing the data to be processed, address of output buffers in which the results of processing is to be stored, and (optionally) other payload, such as function opcodes, completion records, etc. Once the ring entry (e.g., descriptor) is updated, the thread updates metadata register 104 notifying a polling controller or mechanism that a valid entry 112 has been added to the ring. Generally, the metadata can be located in memory, such as a bit-per-ring-entry structure, also referred to as a status flag or simply "flag." In one embodiment a pair of registers of type "write 1 to set/write 1 to clear" could be used. Optionally, a single bit-wise register may be used with a bit (flag) value of '1' indicating the entry in the ring at the same index as the metadata bit is valid, while a bit (flag) value of '0' may be used to indicate an invalid entry.

One type of lockless arbiter, such as implemented in the DPDK, is based on competition to a particular ring slot. If the requester fails in the competition (because another thread was successful), the thread must retry continually until successful. If several threads are updating the ring, they generally must cooperate on updating the tail pointer. The tail pointer, which point to the slot index at the current "tail" of the ring is to be updated in order (e.g., sequentially). If a thread has finished updating a ring entry but a previous ring entry has not been completed by a parallel thread, the thread must wait until the previous ring entry is completed. The access to the ring is serialized in the final phase.

The lockless arbiter scheme used herein provides a mechanism that avoids competition for the ring slots by allocating slot indexes to requesting threads using atomic operations. Once a requesting thread is provided with an index on the ring, the thread is guaranteed access to the slot on the ring associated with the index without contention from other threads.

Figure 2:
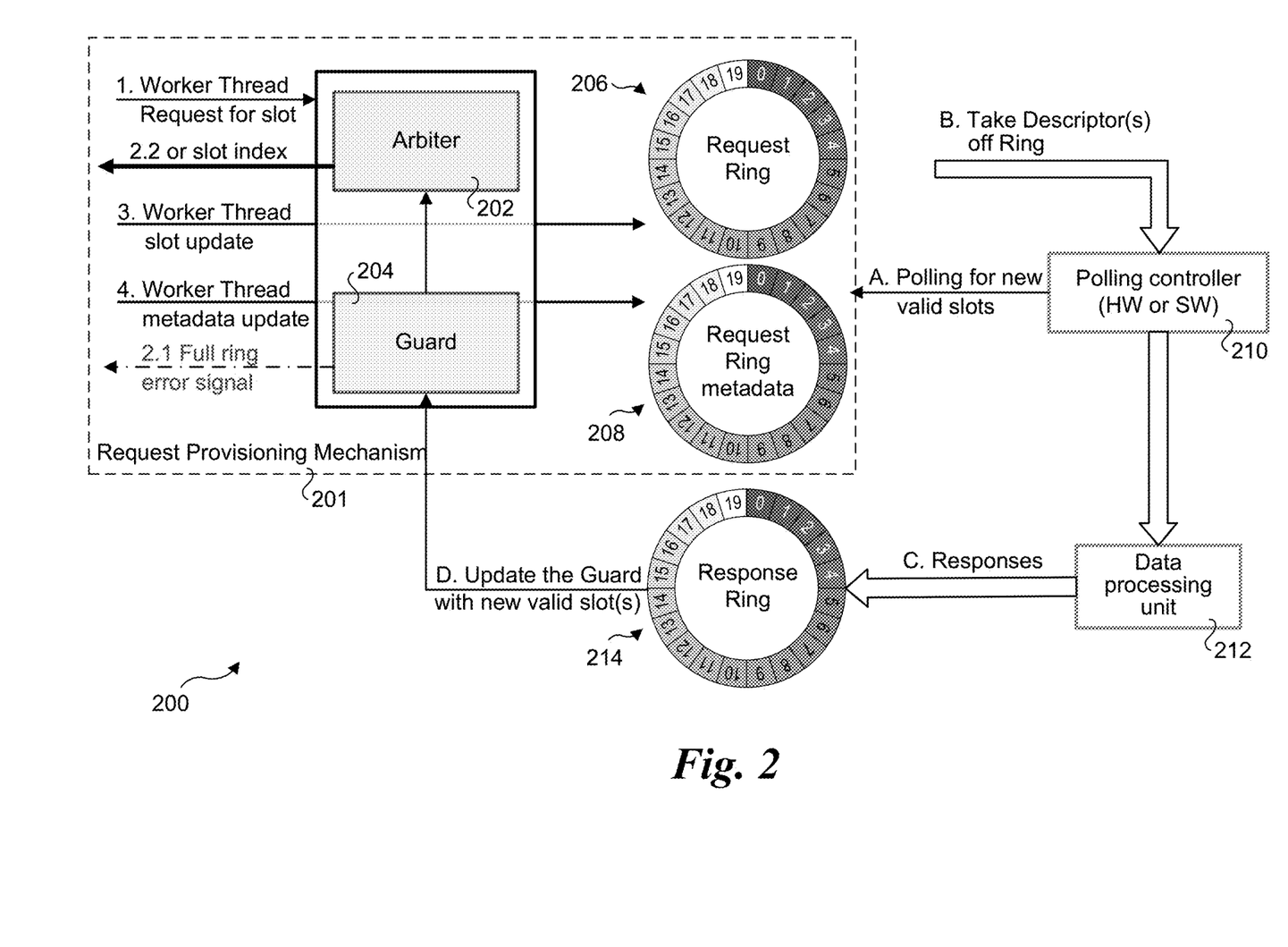
FIG. 2 is a schematic diagram illustrating aspects of a request provisioning mechanism and associated components, according to one embodiment.
Figure 3:
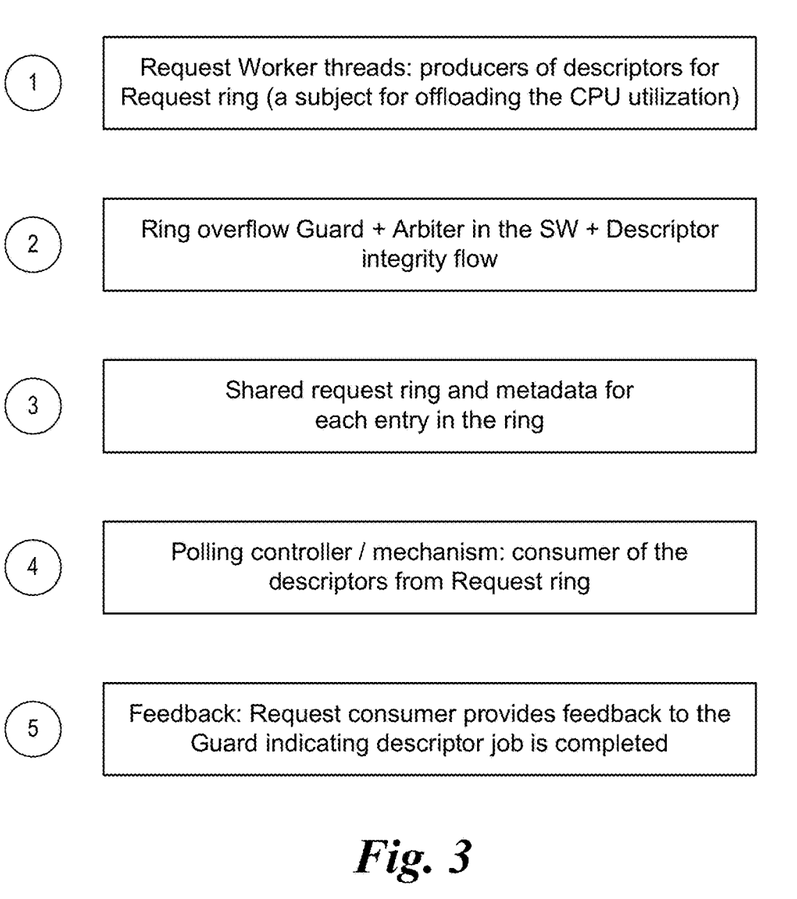
FIG. 3 is a block diagram illustrating the high-level sequences of stages and functional blocks associated with the request provisioning mechanism, according to one embodiment.

FIG. 2 shows a diagram 200 illustrating further details of a request provisioning mechanism 201, according to one embodiment. As shown, the mechanism includes an arbiter 202, a ring overflow guard 204, a request ring 206, and request ring metadata 208. In addition, FIG. 2 further depicts a polling controller 210, a data processing unit 212, and a response ring 214. The high-level sequences of stages and functional blocks associated with the request provisioning mechanism are shown in FIG. 3 and include:

1. Request Worker threads: producers of descriptors for Request ring (a subject for offloading the CPU utilization)
2. Ring overflow Guard+Arbiter in the Software (SW)+ Descriptor integrity flow
3. Shared request ring and metadata for each entry in the ring
4. Polling controller/mechanism: consumer of the descriptors from Request ring
5. Feedback: Request consumer provides feedback to the Guard indicating the descriptor job is completed.

Figure 4:
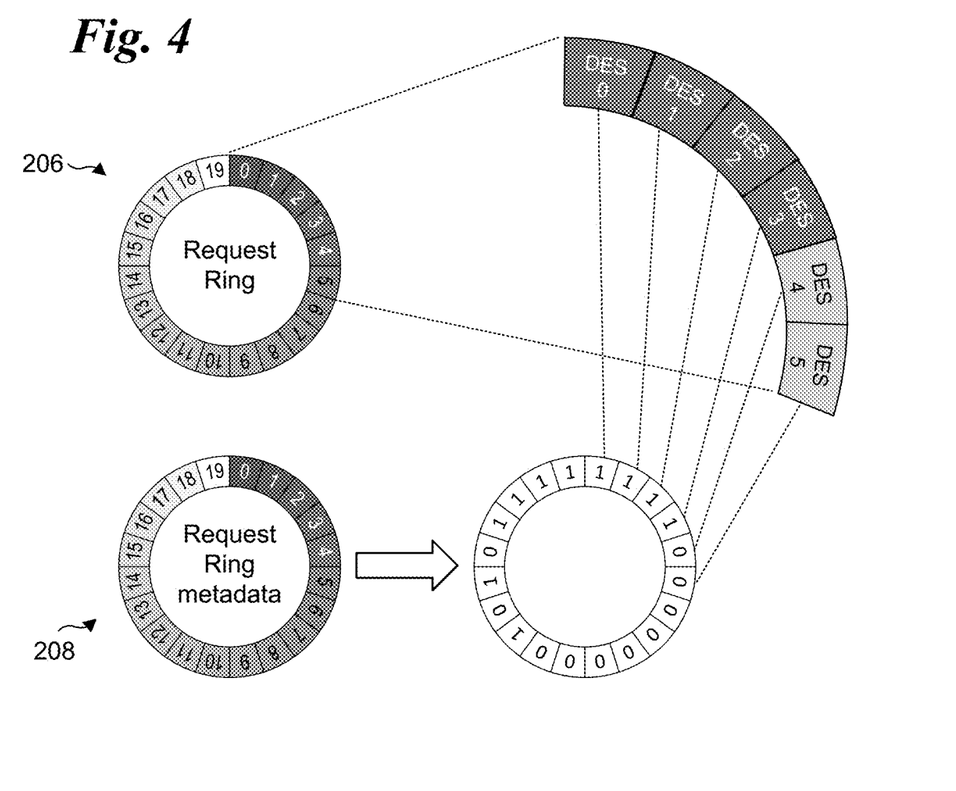
FIG. 4 is a schematic diagram illustrating details of request ring entries comprising descriptors that are stored in slots on a request ring having respective indexes, and request ring metadata associated with the descriptors based on the indexes of slots.

Further details of the data structures for request ring 206 and request ring metadata 208, according to one embodiment, are shown in FIG. 4. Generally, the request ring will include a number of slots in which entries comprising descriptors are written. For illustrative purposes, there are 20 slots (0-19) in the request rings depicted herein; an actual implementation may include a significantly larger number of slots, depending on the particular environment and number of concurrent threads to be supported. As depicted in the upper-right portion of FIG. 4, each slot is used to store a respective descriptor, as depicted as DES 0, DES 1, DES 2, DES 3, DES 4, and DES 5 for slots 0, 1, 2, 3, 4, and 5 of request ring 206.

The request ring metadata is used to identify which slots contain valid entries. In this case, a valid entry refers to a descriptor entry that has been added to the request ring, but as yet to be consumed. Once an entry is consumed (e.g., taken off the request ring by an accelerator or an accelerator descriptor queueing thread), the entry's corresponding slot in the request ring is marked invalid so that another consumer will not attempt to take it. Under one approach, a bit in the descriptor entries themselves could be used as a valid/invalid flag. However, this would require a significant amount of data to be read to determine the status of the slots in the request ring.

Under the approach implemented by the embodiments described herein, the request ring metadata is used to track the valid/invalid status of the descriptor entries on the request ring. As illustrated in FIG. 4, there is a request ring metadata bit (aka flag) for each slot in the request ring. The metadata bits are depicted as having a value of '1' or '0', where a '1' indicates the corresponding slot in request ring 206 is valid, and a '0' indicating the corresponding slot in the request ring is invalid. Of course, this logic could be flipped such that a '0' could be used to mark a slot as valid and a '1' could be used to mark a slot as invalid. As further illustrated in FIG. 4, the work request entries DES 0, DES 2, DES 3, and DES 4 are shaded in dark gray to indicate these are valid entries, while work request entries DES 2 and DES 5 are shade in light gray to indicate they are invalid entries.

Returning to FIG. 2, the request ring mechanism 201 operates as follows. During a first operation (1), Arbiter 202 receives a request for a slot from a worker thread. In conjunction with each request, guard 204 determines whether there are any available slots or the ring is full, as described below with reference to FIGS. 9 and 10. As discussed above, if the request ring is full, a "full ring" error signal is returned by guard 204, as depicted as a first result for a second operation (2.1). Otherwise, if there is an available slot, arbiter 202 returns an index of a next available slot, as depicted by a second result for the second operation (2.2).

If a slot index is returned, the worker thread updates the descriptor entry that is currently stored in the slot with a new descriptor entry (e.g., by overwriting any existing data in the slot), as depicted by a third operation (3). During a fourth operation (4), the worker thread then updates the metadata flag in request ring metadata 208 for the index of the slot, e.g., by flipping the flag's bit value. For example, under the configuration where a '1' metadata bit value represents a valid slot, the metadata bit value will be flipped from a '0' (i.e., the prior invalid state) to a '1'.

In parallel with descriptor entries being updated on request ring 206 by producers (the worker threads), polling controller 210 is "taking" valid descriptor entries off request ring 206 and invalidating those entries. Generally, the operations of updating descriptor entries on request ring 206 and taking valid descriptors off the request ring will be performed asynchronously.

As illustrated in operation 'A' in FIG. 2, polling controller 210 polls request ring metadata 208 for new valid slots. For one or more new valid slots that are found, polling controller 210 takes the corresponding descriptors off request ring 206, as depicted by operation 'B'. Each time a descriptor is taken off request ring 206, its corresponding slot is made available for replacement. Accordingly, in operation 'C' polling controller 210 provides information to guard 204 to enable the guard to update the metadata in request ring metadata 208 to reflect new available slots.

In one embodiment the arbiter is a lockless software component that arbitrates where a CPU thread (producer) will put its own work descriptor (e.g., its own descriptor entry). The arbiter assigns a slot index to the request ring for each accessed thread that requests to access the ring (if the request ring is not full). Once a producer is given a slot index, the CPU thread can write its descriptor into the shared ring on the given index position without contention from other producers.

Figures 5, 8:
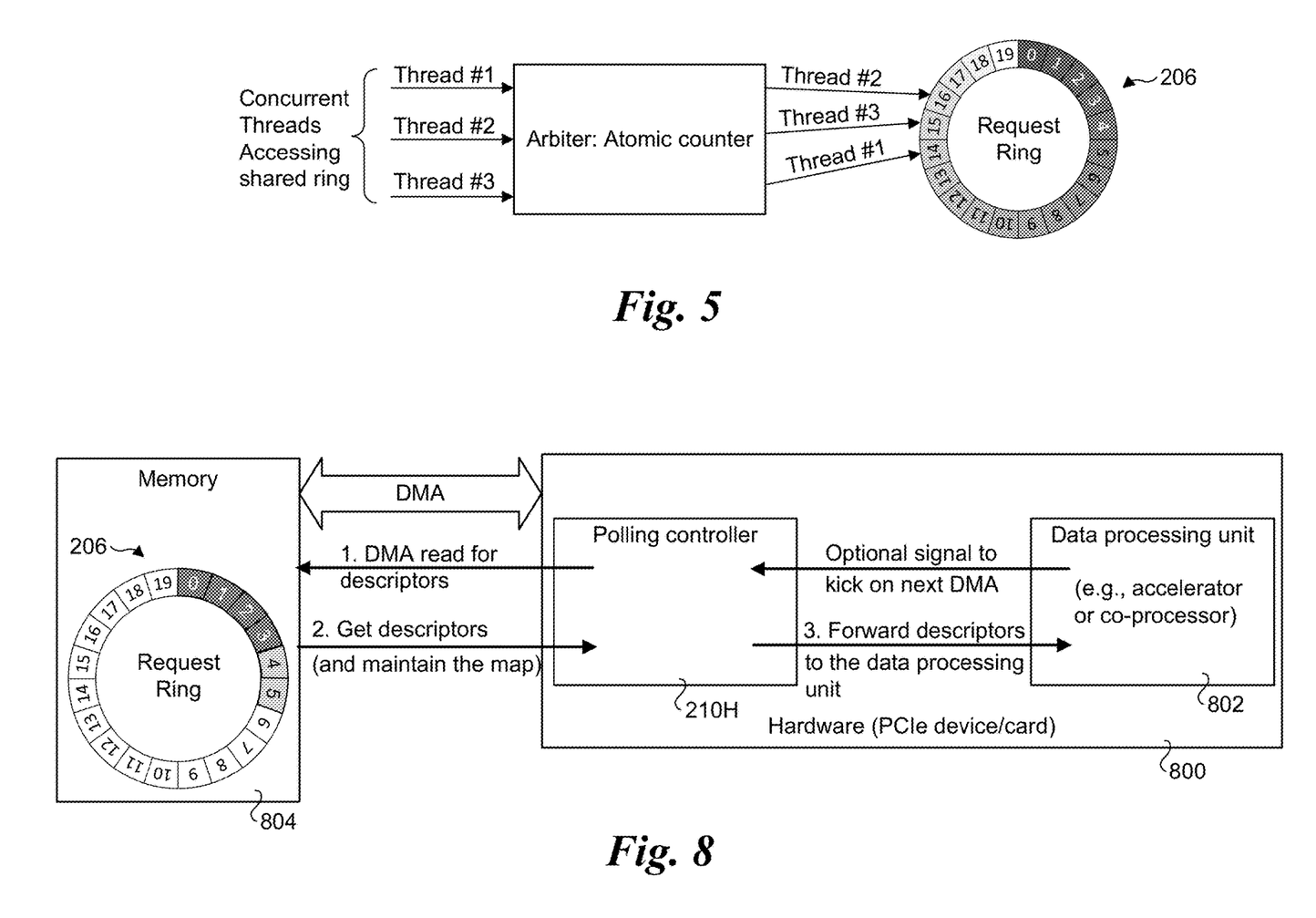
FIG. 5 is a schematic diagram illustrating a high-level operation of an arbiter including an atomic counter, according to one embodiment.
FIG. 8 is a schematic diagram illustrating operations performed by a polling controller implemented in hardware on an PCIe offload device.

As shown in FIG. 5, a plurality of concurrently executing threads, represented as Thread #1, Thread #2, and Thread #3, submit ring access requests to arbiter 202, which is implemented with an atomic counter. The atomic counter is lockless (does not use software locks), and is implemented using an atomic operation that is immediately executed upon receipt of a request as described below. As illustrated in FIG. 5, the atomic counter of arbiter 202 assigns slot index 14 to Thread #1, slot index 15 to Thread #3, and slot index 16 to Thread #2. In contrast to current arbitration techniques employing software locks discussed above, the use of the atomic counter enables arbiter 202 to be lockless, which eliminates user-to-kernel context switch requirements and also eliminates waiting in sleep for producers.

Generally, the atomic counter may allocate indexes sequentially in some embodiments, or use a combination of sequential and non-sequential index allocations in other embodiments. For example, if a next slot index in a sequence is not available, then the atomic counter will increment its count to the next slot (in the sequence) until an available slot is found.

Figure 6:
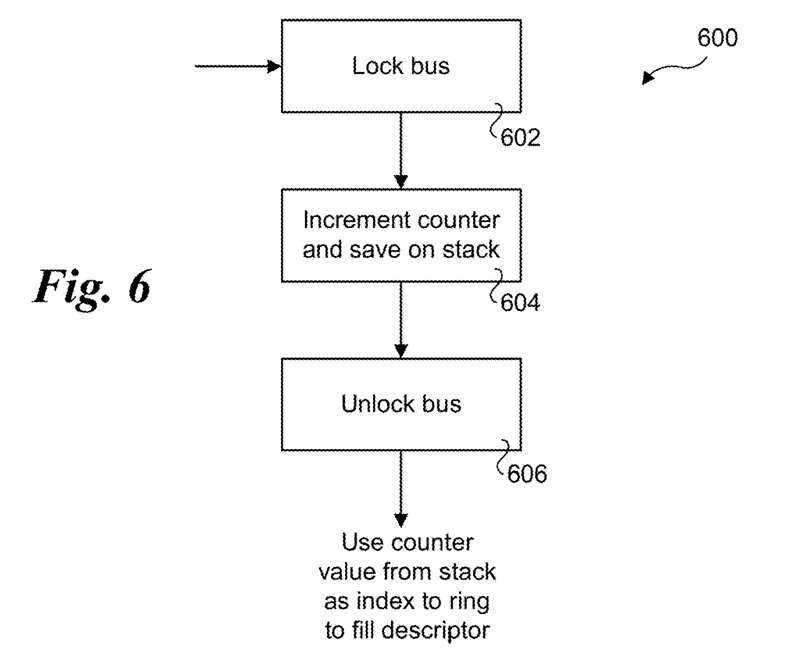
FIG. 6 is a flowchart illustrating operations performed to increment the arbiter atomic counter and return an index.

FIG. 6 shows a flowchart 600 illustrating operations performed by an arbiter employing an atomic counter, according to one embodiment. In a block 602, a bus shared by the processor cores is locked. In a block 604, the atomic counter is incremented, and the counter value is saved on the stack. In a block 606 the bus is unlocked. The counter value from the stack is then used as the index to the ring to fill the descriptor.

In some embodiments a modulo function or the like may be used to identify the index. For example, rather than reset the counter each time a maximum index position is reached, a modulo (mod) Index_max operation may be used, such as, $$Index = Counter \bmod Index\_max$$

where Index_max is the maximum index value (e.g., equal to the number of slots on the request ring).

Under another embodiment, elision locking of a small counter is used. Elision locking, also referred to as speculative locking or transaction lock elision, is supported by processors that support hardware transaction memory, such as processors with Intel® Transactional Synchronization Extensions (Intel® TSX). Operations for implementing elision locking are shown in a flowchart 700 in FIG. 7.

Figure 7:
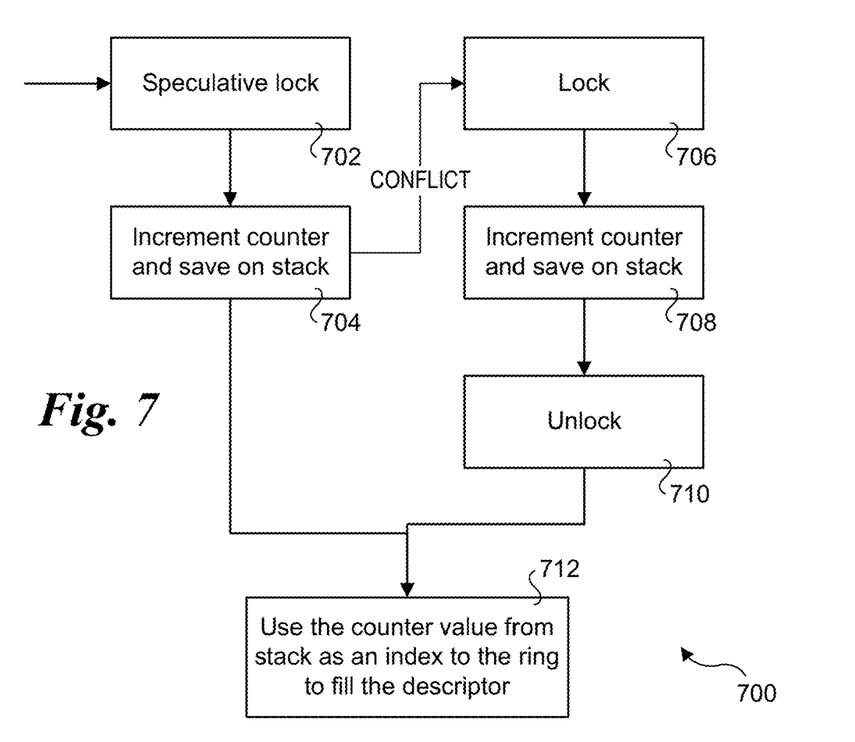
FIG. 7 is a flowchart illustrating operations and logic for implementing a counter index scheme using elision locking, according to one embodiment.

The process begins with a speculative lock in a block 702. The counter is then incremented and saved on the stack in a block 704. If no conflict is detected, the logic proceeds to a block 712 in which the counter value from the stack is used as the index to the ring to fill the descriptor. However, if a conflict is detected (e.g., another thread submits a request for index to the arbiter during the speculative lock and incrementing of the counter), the logic proceeds to a block 706 in which a lock is obtained. Block 706 returns a value indicating the arbiter is "busy." The counter is then incremented in a block 708, with the incremented counter value saved on the stack. In a block 710 the lock is unlocked, and the logic proceeds to block 712 to user the counter value from the stack as an index to the ring to fill the descriptor.

Polling Mechanism/Controller

As discussed above, the polling controller polls for a "valid" bit or flag in the request ring metadata to identify the index or indexes of slots in the request ring containing valid entries (e.g., valid descriptors). Upon identifying the index of a valid metadata bit, the polling controller takes the correspond valid descriptor from the same index (as the metadata bit) on the request ring and passes/forwards the descriptor to an offload processing unit, such as an accelerator or co-processor. After the descriptor is taken from a given slot on the request ring, the entry is invalidated by flipping the metadata flag in the request ring metadata at the index of the slot.

Generally, the polling controller may be implemented in software or hardware, depending on the implementation. For example, FIG. 8 shows an embodiment of a polling controller 210H that is implemented in hardware on a PCIe device or card 800 including an offload device comprising a data processing unit 802. The access sequence may be initiated by the polling controller, or the data processing unit. For example, as shown, data processing unit may optionally signal to kick on the next DMA transaction. Alternatively, polling controller 210H may initiate DMA transactions on its own, such as depicted by a first operation (1).

As described above, in one embodiment the polling controller will obtain the request ring metadata to determine which slots in request ring 206 contain a valid descriptor. During a second operation (2), one or more descriptors are read from request ring 206 using DMA transactions. In conjunction with a DMA read, a given descriptor is taken off the request ring. In practice, the descriptor data in the slot is simply read and the status of the slot is marked as invalid by flipping the metadata bit in the request ring metadata at the entry's index to invalidate the slot. The descriptor access sequence is completed during a third operation (3) during which polling controller 210H forwards the one or more descriptors to data processing unit 802.

Under a conventional approach in current use, descriptors are written by software threads executing on the host CPU into memory and/or registers on-board the offload device using MMIO accesses or transactions. Under the approach illustrated in FIG. 8, DMA transactions are employed by the offload device to access the descriptors, which reduces the CPU workload, since DMA transactions do not consume CPU cycles.

In one embodiment under which the polling controller is implemented in software, MONITOR/MWAIT instructions are used to collect metadata instead of polling loops. However, this entail MMIO operations, as the descriptors are written by the polling controller into memory on-board the offload device using MMIO operations.

Ring Overflow Guard

To prevent ring overflow (e.g., submission of more descriptor entries than the number of slots in the ring, resulting in overwriting of valid descriptors), the guard mechanism is used. In one embodiment, an atomic in-flight counter is used to enable the counter to be incremented or decremented without use of software locks in the threads used to access the counter.

Figure 9:
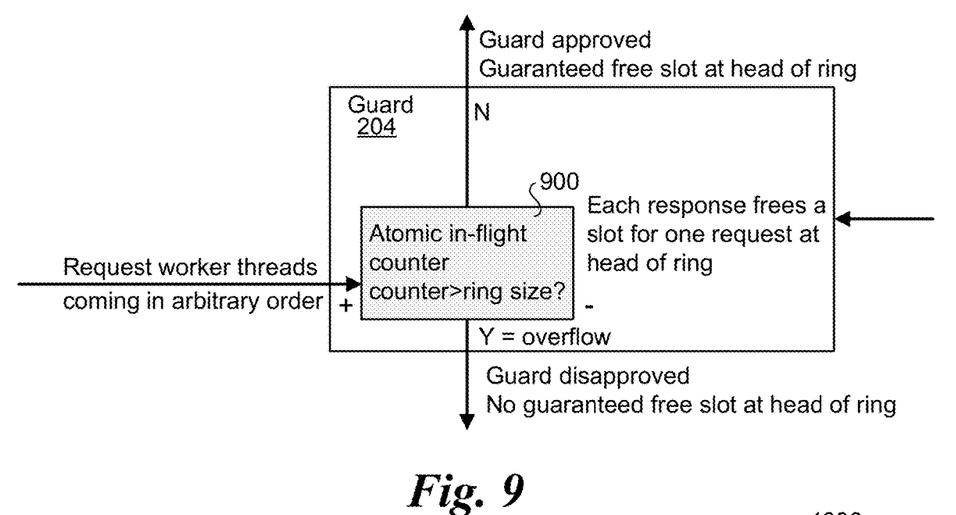
FIG. 9 is a flow diagram illustrating operations of a ring overflow guard, according to one embodiment.
Figure 10:
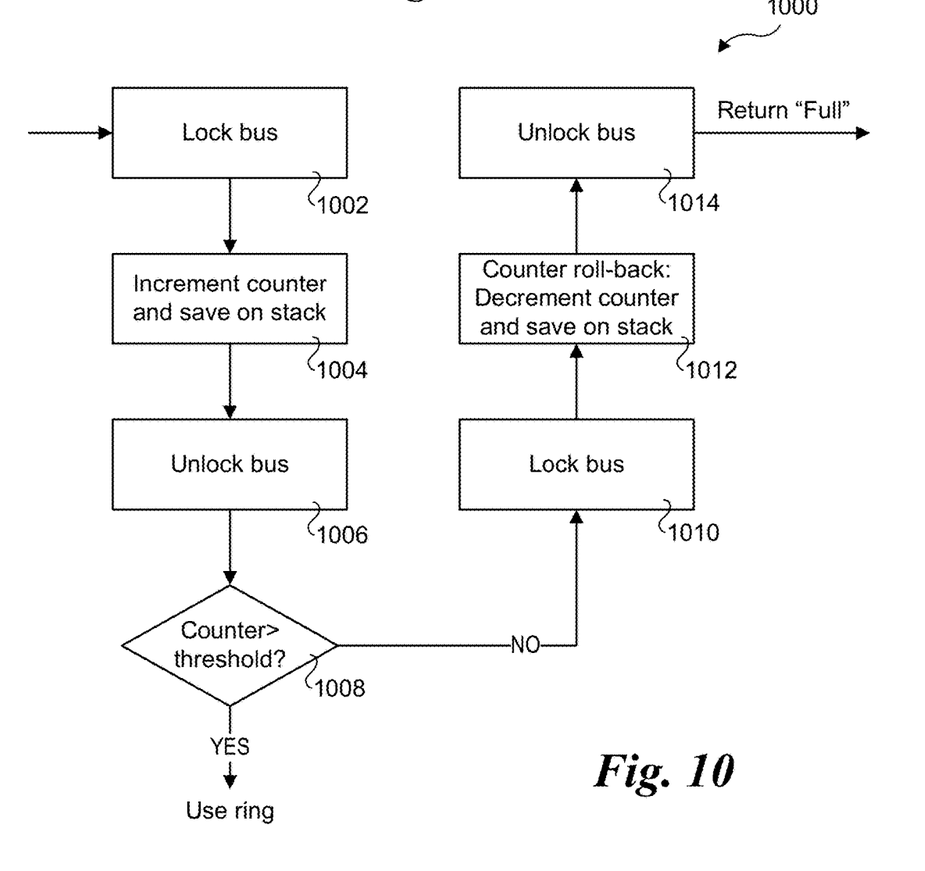
FIG. 10 is a flowchart illustrating operations and logic performed by a ring overflow guard in response to a request to access a request ring, according to one embodiment.

FIG. 9 shows inputs and outputs of guard 204 including an atomic in-flight counter 900, while a flowchart 1000 in FIG. 10 shows operations and logic for implementing the atomic in-flight counter, according to one embodiment. As described above with reference to FIG. 2, the arbiter block that includes guard 204 receives requests for worker threads that are received in arbitrary order. Atomic in-flight counter 900 is used to track the number of entries on the request ring to prevent ring overflow and operates as follows.

In response to receiving a request from a worker thread, the bus is locked in a block 1002 of flowchart 1000. The atomic counter is incremented by 1 in a block 1004, and the counter value is saved on the stack. The bus is then unlocked in a block 1006. In a decision block 1008, a determination is made to whether the counter is greater than a threshold, such as the number of slots on the request ring. If the counter is less than the threshold, the answer to decision block 1008 is YES, and the worker thread is provided with the index generated by the arbiter and allowed to add its descriptor to the request ring.

If the request ring is full, the counter will be greater than the threshold and the answer to decision block 1008 will be NO. The logic will then proceed to a block 1010 to lock the bus. In a block 1012 a counter roll-back operation is performed by decrementing the counter by 1 and saving the counter value on the stack; this operation in combination with the previous operations returns the counter value to the value it had before the current worker thread request was received. In a block 1014 the bus is unlocked, and indicia indicating the request ring is full is returned to the worker thread.

As descriptors are added to the request ring by the producers (worker threads), consumers (accelerator threads) are taking descriptors off the request ring and processing those descriptors to produce results that are written back to SVM as "responses." In the embodiment shown in FIG. 2, the responses are written to slots in a response ring 214, with the optional use of response ring metadata (not shown). Response threads (associated with the applications employing the worker threads) are used to read the responses from response ring 214. In conjunction with reading the responses, the response threads provide indicia to guard 204 that the response has been posted (thus completing job/task defined by the corresponding descriptor); the completion of the descriptor (by way of the posted response) means that accelerator is free to do additional work. As a result, the guard decrements its atomic counter. Optionally, the resource thread may directly decrement the guard's atomic counter.

Figure 11:
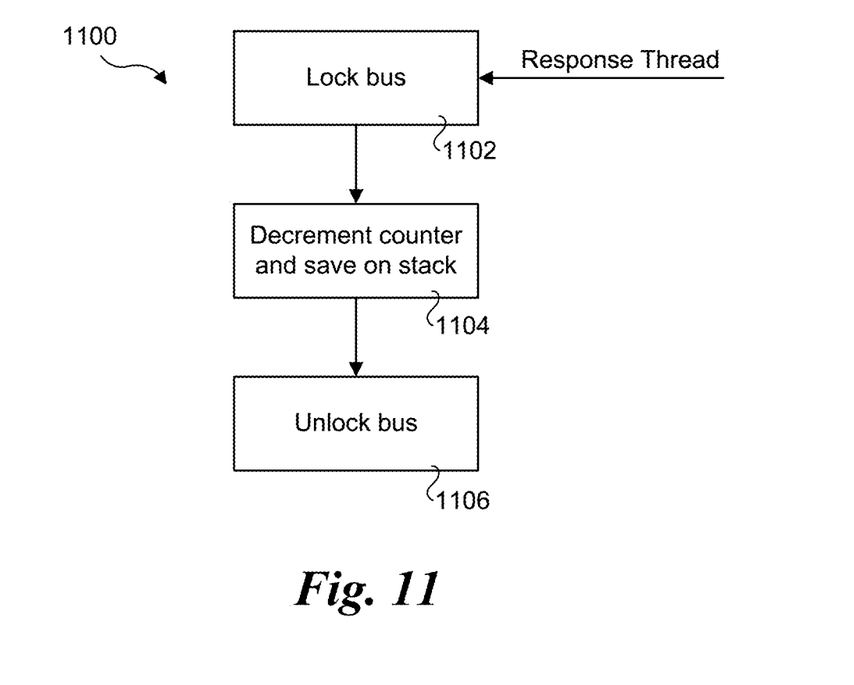
FIG. 11 is a flowchart illustrating operations associated with decrementing an atomic counter of a ring overflow guard.

FIG. 11 shows a flowchart 1100 illustrating the operations for decrementing the guard atomic counter, according to one embodiment. In a block 1102 the bus is locked. The guard atomic counter is then decremented in a block 1104 and saved on the stack to update the counter value. The bus is then unlocked in a block 1106.

Figure 12A:
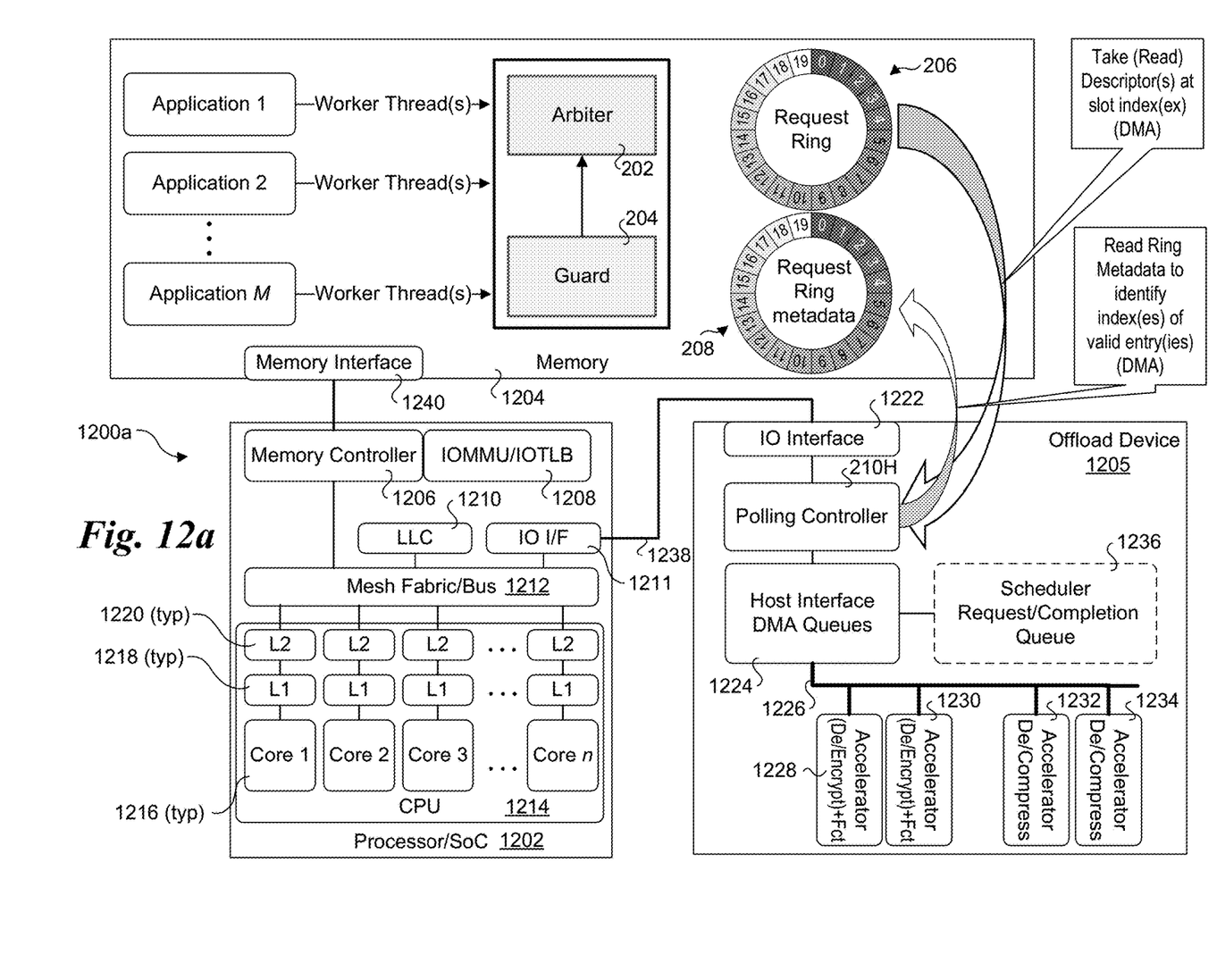
FIG. 12a is a diagram illustrating a platform architecture including a processor coupled to system memory and an offload device including a plurality of accelerators and a polling controller implemented in hardware on the offload device, according to one embodiment.

FIG. 12a shows selective portions of a platform architecture 1200a including a processor 1202 implemented as an SoC coupled to system memory 1204 and an offload device 1205. Processor 1202 includes a memory controller 1206, an IO Memory Management Unit and IO Translation Lookaside Buffer (IOMMU/IOTLB) 1208, a Last-level cache (LLC) 1210, an IO interface (I/F) 1211, a mesh fabric/Bus 1212, and a CPU 1214 including n processor cores 1216, each including a respective L1 cache 1218 and L2 cache 1220.

Offload device 1205 includes an IO interface 1222, a polling controller 210H, host interface DMA queues 1224, and interconnect 1226, and a plurality of data processing units depicted as accelerators 1228, 1230, 1232, and 1234. Offload device 1205 may also include an optional scheduler request/completion queue 1236. IO interface 1222 is connected to IO interface 1211 on processor 1202 via an IO link 1238. In one embodiment, IO interfaces 1211 and 1222 are PCIe interfaces and IO link 1238 is a PCIe link. However, this is not meant to be limiting, as other types of existing and future IO interfaces and IO links supporting DMA transactions may be used.

System memory 1204 is depicted as a monolithic address space for illustrative purposes. The memory may be physically implemented using one or more memory devices the are coupled to memory controller 1206 via a memory interface 1240. For example, such memory devices may include DDR3 or DDR4 DIMMs, non-volatile DIMMs (NVDIMMs), or other types of memory devices used in computing platforms such as computer servers, server blades, and server modules in the like. Although a single memory controller is shows for simplicity, and processor may include multiple memory controllers, each of which may be connected to one or more memory devices via one of more memory channels.

As discussed above, arbiter 202, guard 204, request ring 206, and request ring metadata 208 and the response ring (not shown to avoid crowding) are implemented in a portion of the address space of memory 1204 configured as shared virtual memory, the associated atomic counters and data structures may be accessed by multiple worker threads and response threads. The worker threads and response threads (not shown) are associated with M applications having their own respective memory spaces in system memory 1204, as depicted by applications 1, 2, . . . M. Generally, a given application may employ one or more worker threads and response threads. To optimize cache coherency and avoid cache thrashing, a given application and its associated threads will generally execute on a single core 1216, while the threads may collectively execute on multiple cores.

Generally, the functional blocks on offload device 1205 may be implemented using various types of embedded logic, including but not limited to firmware executed on one or more processing elements such as an embedded processor, microcontroller, etc., an embedded application specific integrated circuit (ASIC), or pre-programmed or programmable logic implemented using a Field Programmable Gate Array (FPGA) or the like. Other types of embedded logic, such as a digital signal processor (DSP), may also be used. Some functional blocks may be implemented using predefined libraries acquired from third parties, or with custom circuitry.

Accelerators and co-processors may likewise be implemented using any of pre-programmed logic, programmable logic and/or one or more embedded processing elements executing firmware. For illustrative purposes, accelerators 1228 and 1230 are depicted as performing encryption and decryption operations, plus one or more additional functions. Accelerators 1232 and 1234 are configured to perform compression and decompression operations. Other types of accelerators configured to perform other types of functions may be implemented in a similar manner to that illustrated in FIG. 12a.

Under platform architecture 1200a, the polling controller 210H is implemented in hardware on offload device 1205 (e.g., as an embedded functional block). The operations of polling controller 210H are similar to that shown in FIG. 8 and discussed above. Polling controller 210H uses DMA transactions to read the metadata on request ring metadata 210 to identify new descriptors that have been added to request ring 206 and uses DMA transactions to take descriptors off the request ring by reading the descriptors. If optional scheduler request/completion queue 1236 is used, polling controller 210H may enqueue descriptors in this queue, or otherwise scheduler request/completion queue 1236 operates as a portal (IO address) to which descriptors are written and employs internal logic to enqueue descriptors written to the portal. This scheme provides ongoing work to the accelerators such that an accelerator may access descriptors from the queue rather than taking (via the polling controller) descriptors off the request ring, which is the approach used when a scheduler request/completion queue is not used. Thus, the scheduler or portal scheme avoids idling accelerators during the time it takes to DMA descriptors from request ring 206 to the accelerators.

Figure 12B:
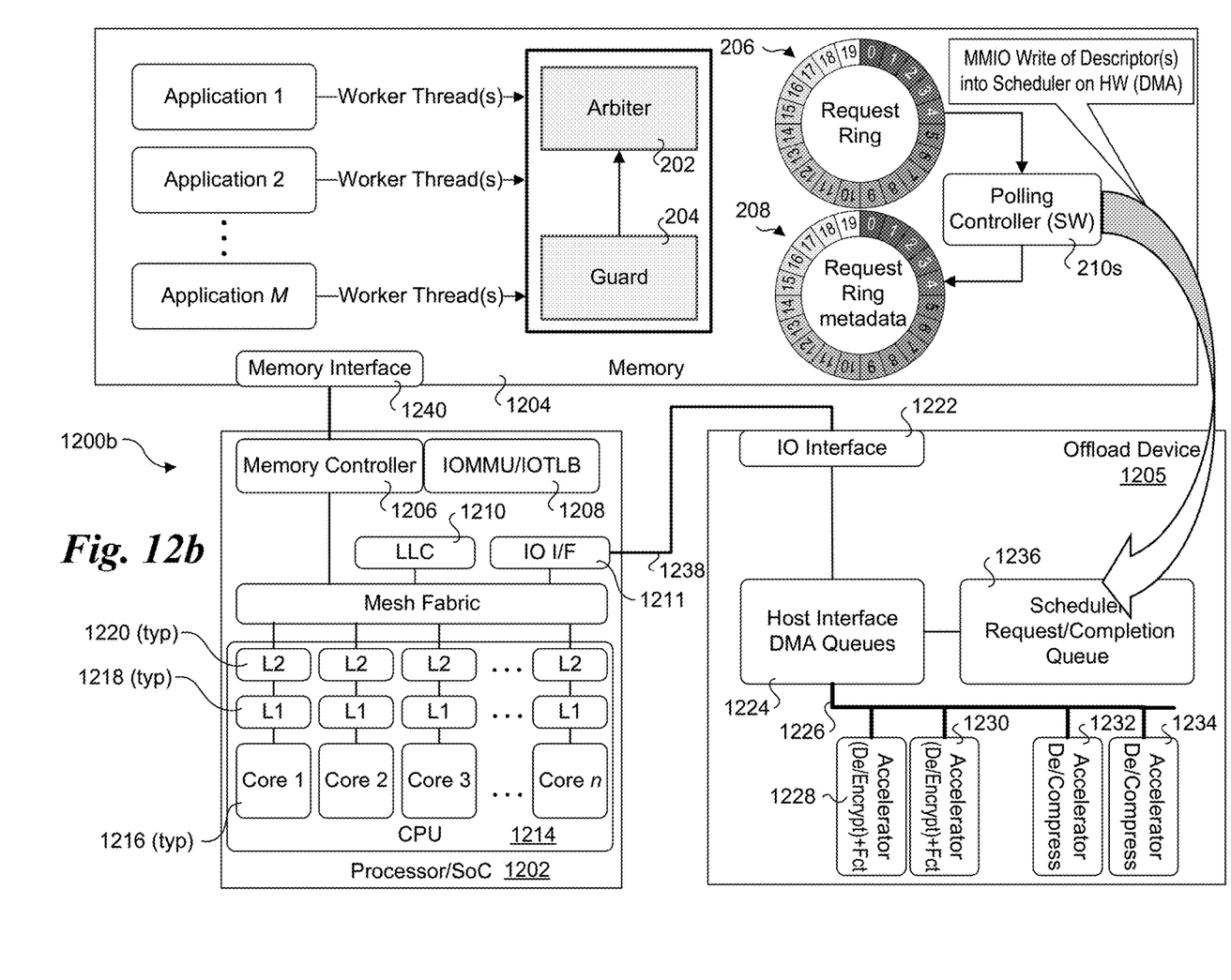
FIG. 12b is a diagram illustrating a platform architecture that is a variant of the platform architecture of FIG. 12b employing the polling controller in software; according to one embodiment.

FIG. 12b shows a platform architecture 1200b under which a polling controller 210S is implemented in software. In this case, polling controller 210S may receive request from the accelerators to take descriptors off the request ring and write those descriptors into scheduler request/completion queue 1236 using MMIO writes over DMA. Optionally, polling controller 210S may use MMIO writes to write the descriptors to a predefined MMIO address on offload device 1205 to enable an accelerator configured to access the MMIO access to read the descriptors written to that address.

Aspects of the embodiments disclosed herein may be used to implement a solution that provides enhanced performance over traditional approaches. For example, on implementation of the solution improves overall performance for CPU cycles spent by the transport layer of the software stack by 3.5× and overall performance is improved by ~10% in the CPM, as demonstrated by the results shown in TABLE 1 below.

TABLE 1

|  | CPU cycles spent by Transport layer | Total throughput (MB/s) with full stack, with 64 B packets, 128 B descriptor size |
| --- | --- | --- |
| Traditional approach | 350 | 714 |
| New approach | 100 | 780 |

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Italicized letters, such as 'n' and 'M' in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method comprising:
   implementing a request ring in a portion of shared virtual memory (SVM) on a computing platform including a multi-core processor and one or more SVM-capable accelerators, the multi-core processor including a bus to which a plurality of processor cores are coupled;
   receiving a plurality of requests to access the request ring from a plurality of worker threads concurrently executing on cores of the multi-core processor cores;
   for a request that is received from a worker thread,
      assigning, via a lockless arbiter without using software locks, an index of an available slot on the request ring and returning the index to the worker thread making the request;
   implementing an atomic counter in a ring overflow guard;
   in response to receiving requests from worker threads to access the request ring, for each request,
      locking the bus,
      incrementing the atomic counter;
      unlocking the bus;
   detecting, via the ring overflow guard, whether the request ring is full by determining whether a value of the atomic counter is greater than a threshold; and
      when the value of the atomic counter is greater than the threshold,
         locking the bus;

decrementing the atomic counter;
unlocking the bus; and
returning indicia to the worker thread that the request ring is full;
otherwise, when the value of the atomic counter is not greater than the threshold, returning an index of an available slot to the worker thread.

2. The method of claim 1, wherein the lockless arbiter is implemented using an atomic counter and the plurality of processor cores are coupled to a bus, further, comprising:
in response to receiving a request to access the request ring from a worker thread,
locking the bus;
incrementing the atomic counter and saving a counter value on a stack;
unlocking the bus; and
returning the counter value as the index returned to the worker thread making the request.

3. The method of claim 1, further comprising:
in conjunction with processing a response that has been returned by the off-load device,
locking the bus;
decrementing the atomic counter; and
unlocking the bus.

4. The method of claim 1, further comprising implementing request ring metadata to track a current status of each slot on the request ring, wherein the request ring metadata comprises a respective flag for each index on the request ring indicating whether a descriptor stored in the slot at that index is valid or invalid.

5. The method of claim 4, further comprising:
in conjunction with writing a descriptor to an available slot in the request ring, flipping a value of the flag in the request ring metadata associated with the index corresponding to the slot to which the descriptor is written.

6. The method of claim 4, further comprising:
polling, via a polling controller, the request ring metadata to identify indexes of one or more valid slots; and
for each of the indexes that are identified,
taking a descriptor off the request ring from a slot at the index; and
flipping the value of the bit in the request ring metadata associated with the index to switch a status of the slot from valid to invalid.

7. The method of claim 6, wherein the polling controller is implemented on the offload device and the request ring and request ring metadata are implemented in SVM, further comprising employing Direct Memory Access (DMA) to enable the polling controller to access the request ring and the request ring metadata.

8. The method of claim 6, wherein the lockless arbiter is implemented in an arbiter block including a ring overflow guard, further comprising:
using the ring overflow guard to detect when the ring is full; and
providing indicia from the ring overflow guard to the lockless arbiter when the ring is full.

9. A computer system, comprising:
a multi-core processor, including:
a plurality of processor cores,
an interconnect fabric, communicatively coupled to each processor core;
a memory controller, communicatively coupled to the interconnect fabric and having one or more memory channels;
an input-output (TO) interface, communicatively coupled to the interconnect fabric;

system memory comprising one or more memory devices, each communicatively coupled to at least one memory channel of the memory controller; and
an offload device including one or more shared virtual memory (SVM)-capable accelerators having one or more functional units, the offload device having an IO interface coupled to the IO interface on the multicore processor via an IO link;
wherein the computer system is configured to,
implement a portion of system memory as SVM;
implement a request ring in the SVM, the request ring including a plurality of slots in which descriptors are stored, each slot having an associated index;
concurrently execute a plurality of worker threads on one or more of the processor cores;
receive a plurality of requests to access the request ring from the plurality of worker threads;
implement a lockless arbiter via execution of software on a processor core that does not employ any software locks;
for a request that is received from a worker thread,
assign, via the lockless arbiter, an index of an available slot on the request ring and return the index to the worker thread; and
write, via the worker thread, a descriptor in a slot of the request ring corresponding to the index.

10. The computer system of claim 9, wherein the lockless arbiter is implemented using an atomic counter, wherein the interconnect fabric includes a bus to which the plurality of processor cores are coupled, and wherein the computer system is further configured to:
in response to receiving a request to access the request ring from a worker thread,
lock the bus;
increment the atomic counter and save a counter value on a stack;
unlock the bus; and
return the counter value as the index returned to the worker thread making the request.

11. The computer system of claim 9, further configured to:
implement a ring overflow guard;
in response to receiving a request from a worker thread to access the request ring,
detect, via the ring overflow guard, whether the request ring is full; and
when the request ring is determined to be full, return indicia to the worker thread indicating the request ring is full, otherwise return an index of an available slot to the worker thread.

12. The computer system of claim 11, wherein the ring overflow guard includes an atomic counter, wherein the interconnect fabric includes a bus to which the plurality of processor cores are coupled, and wherein the computer system is further configured to:
for each request to access the request ring received from a worker thread,
lock the bus
increment the atomic counter;
unlock the bus;
determine whether a value of the atomic counter is greater than a threshold;
when the value of the atomic counter is greater than the threshold,
lock the bus;
decrement the atomic counter;
unlock the bus; and return indicia to the worker thread that the request ring is full.

13. The computer system of claim 12, wherein the ring overflow guard is further configured to:
use an accelerator to process a descriptor, the accelerator producing a response;
write the response into a portion of the SVM;
in conjunction with processing the response,
lock the bus;
decrement the atomic counter; and
unlock the bus.

14. The computer system of claim 9, further configured to implement request ring metadata to track a current status of each slot on the request ring, wherein the request ring metadata comprises a respective flag for each index on the request ring indicating whether a descriptor stored in the slot at that index is valid or invalid.

15. The computer system of claim 14, further configured to:
in conjunction with writing a descriptor to an available slot in the request ring, flip a value of the flag in the request ring metadata associated with the index corresponding to the slot to which the descriptor is written.

16. The computer system of claim 15, wherein the computer system further includes a polling controller, further configured to:
poll, via the polling controller, the request ring metadata to identify indexes of one or more valid slots; and
for each of the indexes that are identified,
take a descriptor off the request ring from a slot at the index; and
flip the value of the bit in the request ring metadata associated with the index to switch a status of the slot from valid to invalid.

17. The computer system of claim 16, wherein the polling controller is implemented on the offload device and the request ring and request ring metadata are implemented in SVM, further comprising employing Direct Memory Access (DMA) to enable the polling controller to access the request ring and the request ring metadata.

18. The computer system of claim 9, wherein the lockless arbiter is implemented in an arbiter block including a ring overflow guard, and wherein the computer system is further configured to:
use the ring overflow guard to detect when the ring is full; and
provide indicia from the ring overflow guard to the lockless arbiter when the ring is full.

19. A non-transitory machine-readable medium having instructions stored thereon configured to be executed on one or more cores of a processor in a computer system including memory, the processor including a memory controller coupled to the memory, wherein at least a portion of the memory is implemented as shared virtual memory (SVM), the computer system further including an offload device communicatively-coupled to the processor and having one or more SVM-capable accelerators, wherein the instructions, upon execution, enable the computer system to:
implement a request ring in a portion of the SVM, the request ring including a plurality of slots in which descriptors are stored, each slot having an associated index;
implement a lockless arbiter that does not employ any software locks;
receive a plurality of requests to access the request ring from a plurality of worker threads concurrently executing on the one or more processor cores;
for a request that is received from a worker thread,
assign, via the lockless arbiter, an index of an available slot on the request ring and return the index to the worker thread making the request; and
enable the worker thread to write a descriptor to the available slot in the request ring corresponding to the index without contention from other worker threads.

20. The non-transitory machine-readable medium of claim 19, wherein the lockless arbiter is implemented using an atomic counter, wherein the processor includes a bus to which the plurality of processor cores are coupled, and wherein execution of the instructions further enables the computer system to:
in response to receiving a request to access the request ring from a worker thread,
lock the bus;
increment the atomic counter and save a counter value on a stack;
unlock the bus; and
return the counter value as the index returned to the worker thread making the request.

21. The non-transitory machine-readable medium of claim 19, wherein execution of the instructions further enables the computer system to:
implement a ring overflow guard;
in response to receiving a request from a worker thread to access the request ring,
detect, via the ring overflow guard, whether the request ring is full; and
when the request ring is determined to be full, return indicia to the worker thread indicating the request ring is full, otherwise return an index of an available slot to the worker thread.

22. The non-transitory machine-readable medium of claim 21, wherein the ring overflow guard includes an atomic counter, wherein the processor includes a bus to which the plurality of processor cores are coupled, and wherein execution of the instructions further enables the computer system to:
for each request to access the request ring received from a worker thread,
lock the bus
increment the atomic counter;
unlock the bus;
determine whether a value of the atomic counter is greater than a threshold;
when the value of the atomic counter is greater than the threshold,
lock the bus;
decrement the atomic counter;
unlock the bus; and
return indicia to the worker thread that the request ring is full.

23. The non-transitory machine-readable medium of claim 21, wherein execution of the instructions further enables the computer system to:
determine a descriptor has been taken off the request ring; and
in response thereto,
lock the bus;
decrement the atomic counter; and
unlock the bus.

* * * * *

UNITED STATES PATENT AND TRADEMARK OFFICE
CERTIFICATE OF CORRECTION

| | |
|---|---|
| PATENT NO. | : 11,748,174 B2 |
| APPLICATION NO. | : 16/590490 |
| DATED | : September 5, 2023 |
| INVENTOR(S) | : Juraj Vanco, Conor McLoughlin and John J. Browne |

It is certified that error appears in the above-identified patent and that said Letters Patent is hereby corrected as shown below:

In the Claims

Claim 9 should read:
A computer system, comprising:
    a multi-core processor, including:
        a plurality of processor cores,
        an interconnect fabric, communicatively coupled to each processor core;
        a memory controller, communicatively coupled to the interconnect fabric and having one or more memory channels;
        an input-output (IO) interface, communicatively coupled to the interconnect fabric;
    system memory comprising one or more memory devices, each communicatively coupled to at least one memory channel of the memory controller; and
    an offload device including one or more shared virtual memory (SVM)-capable accelerators having one or more functional units, the offload device having an IO interface coupled to the IO interface on the multicore processor via an IO link;
    wherein the computer system is configured to,
        implement a portion of system memory as SVM;
        implement a request ring in the SVM, the request ring including a plurality of slots in which descriptors are stored, each slot having an associated index;
        concurrently execute a plurality of worker threads on one or more of the processor cores;
        receive a plurality of requests to access the request ring from the plurality of worker threads;
        implement a lockless arbiter via execution of software on a processor core that does not employ any software locks;
        for a request that is received from a worker thread,
            assign, via the lockless arbiter, an index of an available slot on the request ring and return the index to the worker thread; and Signed and Sealed this
Thirtieth Day of January, 2024

*Katherine Kelly Vidal*
*Director of the United States Patent and Trademark Office* write, via the worker thread, a descriptor in a slot of the request ring corresponding to the index.